United States Patent
Cavalieri et al.

(10) Patent No.: US 10,150,828 B2
(45) Date of Patent: Dec. 11, 2018

(54) PROCESS FOR PRODUCING PROPYLENE TERPOLYMERS

(75) Inventors: Claudio Cavalieri, Ferrara (IT); Camillo Cagnani, Ferrara (IT); Alessandro Guidicini, Ferrara (IT)

(73) Assignee: Basell Poliolefine Italia S.r.l., Milan (IT)

(*) Notice: Subject to any disclaimer, the term of this patent is extended or adjusted under 35 U.S.C. 154(b) by 1124 days.

(21) Appl. No.: 12/733,016

(22) PCT Filed: Jul. 29, 2008

(86) PCT No.: PCT/EP2008/059938
§ 371 (c)(1),
(2), (4) Date: Feb. 2, 2010

(87) PCT Pub. No.: WO2009/019169
PCT Pub. Date: Feb. 12, 2009

(65) Prior Publication Data
US 2010/0137505 A1   Jun. 3, 2010

Related U.S. Application Data

(60) Provisional application No. 60/963,366, filed on Aug. 3, 2007.

(30) Foreign Application Priority Data

Aug. 3, 2007  (EP) .................... 07113749

(51) Int. Cl.
| | |
|---|---|
| *C08F 2/34* | (2006.01) |
| *C08F 210/06* | (2006.01) |
| *C08F 210/16* | (2006.01) |
| *C08J 5/18* | (2006.01) |
| *C08F 2/00* | (2006.01) |

(52) U.S. Cl.
CPC .......... *C08F 210/16* (2013.01); *C08F 210/06* (2013.01); *C08J 5/18* (2013.01); *C08F 2/001* (2013.01); *C08F 2/34* (2013.01); *C08J 2323/14* (2013.01)

(58) Field of Classification Search
CPC ...... C08F 210/06; C08F 210/16; C08F 2/001; C08F 2/34; C08J 5/18; C08J 2323/14
USPC ............................................. 526/64, 65, 351
See application file for complete search history.

(56) References Cited

U.S. PATENT DOCUMENTS

| | | | | |
|---|---|---|---|---|
| 4,433,110 A * | 2/1984 | Baba et al. | ............ | 525/323 |
| 4,483,971 A * | 11/1984 | Sato et al. | ............ | 526/142 |
| 4,761,462 A * | 8/1988 | Kitamura | ............ | C08F 210/06 526/119 |
| 5,698,642 A * | 12/1997 | Govoni et al. | ............ | 526/65 |
| 6,451,936 B1 * | 9/2002 | Sadatoshi et al. | ............ | 526/125.3 |
| 6,689,845 B1 * | 2/2004 | Govoni et al. | ............ | 526/65 |
| 6,908,967 B2 | 6/2005 | Collina et al. | | |
| 2005/0009957 A1 * | 1/2005 | Alastalo et al. | ............ | 523/348 |
| 2011/0293869 A1 * | 12/2011 | Myhre | ............ | C08F 8/50 428/36.92 |

FOREIGN PATENT DOCUMENTS

| | | | | |
|---|---|---|---|---|
| EP | 373660 A2 * | 6/1990 | ............ | C08F 297/08 |
| EP | 728769 A1 * | 8/1996 | ............ | C08F 10/00 |
| EP | 0591224 B1 * | 2/1998 | ............ | C08F 10/00 |
| JP | H11-511805 A | 10/1999 | | |
| JP | 2002504956 A | 2/2002 | | |
| WO | WO-97/04015 A1 | 2/1997 | | |
| WO | WO 9858971 A1 * | 12/1998 | ............ | C08F 10/06 |

* cited by examiner

*Primary Examiner* — Roberto Rabago

(57) ABSTRACT

The present invention relates to a process for producing a propylene terpolymer comprising comonomer units derived from ethylene and from one alpha-olefin selected from the group of $C_4$-$C_8$ alpha-olefins and being characterized by a total content of comonomer units not less than 8% wt and a value of the ratio of ethylene to the $C_4$-$C_8$ alpha-olefins ranging from 0.1 to 0.8, said process being carried out in a gas-phase reactor comprising two interconnected polymerization zones.

The present invention further relates to the propylene terpolymer obtained by said process particularly suitable to be used as films such as cast films, bi- or mono-oriented films and heat-sealable films having good optical properties and excellent sealing properties combined with good shrinkage properties and softness.

9 Claims, No Drawings

PROCESS FOR PRODUCING PROPYLENE TERPOLYMERS

This application is the U.S. national phase of International Application PCT/EP2008/059938, filed Jul. 29, 2008, claiming priority to European Patent Application 07113749.1 filed Aug. 3, 2007, and the benefit under 35 U.S.C. 119(e) of U.S. Provisional Application No. 60/963,366, filed Aug. 3, 2007; the disclosures of International Application PCT/EP2008/059938, European Patent Application 07113749.1 and U.S. Provisional Application No. 60/963,366, each as filed, are incorporated herein by reference.

The present invention relates to a process for producing propylene terpolymers. In particular, the present invention relates to the production of propylene terpolymers particularly suitable to be used as films such as cast films, bi- or mono-oriented films and heat-sealable films having good optical properties and excellent sealing properties combined with good shrinkage properties and softness.

The invention also relates to propylene terpolymers having specific chemical properties and being characterized by a specific content of comonomer units and a specific ratio between the different comonomer units.

Films made of propylene copolymers or terpolymers are known in the art.

Propylene copolymers or terpolymers are used because, with respect to propylene homopolymers, are characterized by a better impact, lower rigidity and better transparency. In some cases however, it is difficult to find the acceptable balance between those properties, particularly when properties contrasting to each other are desired. When a certain softness is desired, for example, it is commonly obtained in the presence of high amount of xylene soluble fractions that make them unsuitable for food contact applications.

U.S. Pat. No. 6,221,984 discloses random copolymers of propylene with ethylene and at least one $C_4$-$C_{10}$ alpha-olefin and a process for preparing such random copolymers, which can be used in films, fibers or moldings. In particular, the terpolymers obtained by the process disclosed in this specification are particularly suitable for food packaging films because of their low proportions of xylene-soluble polymer particles (Examples 1-3) but are not suited for applications requiring a certain degree of softness.

On the other hand, when the xylene soluble fraction is increased (comparative examples 1 and 2) and softness is increased, the sealing initiation temperature and the optical properties become unsatisfactory.

WO 03/037981 discloses pipes made from at least a polypropylene composition obtained by a process carried out in a reactor comprising two interconnected polymerization zones. Said process provides polypropylene compositions with high stiffness and impact resistance particularly suitable for pipes. When the propylene composition is a propylene-ethylene-butene-1 copolymer, the flexural modulus is higher than 700 MPa.

The propylene composition disclosed by WO 03/037981 cannot be used in the preparation of films when a certain degree of softness is required.

Furthermore, WO 98/58971 discloses a process for producing terpolymers of propylene, ethylene and other alpha-olefins comprising slurry and gas phase reactors connected together. The process comprises using a combination of two or more reactors connected in a cascade for producing a polymer product exhibiting a ratio of ethylene-to-butene less than 0.3. Such comonomer distribution gives a material having low soluble content in hexane and good optical properties.

The drawback related to the above mentioned terpolymer product is the too low melting temperature and the consequent narrow processability window. In fact, with respect to a given comonomer units content, the higher is the melting temperature of the copolymer, the wider is its processability window.

It is therefore felt the need of propylene polymers suitable to be used in films preparation having an optimal balance between softness, optical properties, processability and also able to be used in food contact applications.

It is an object of the present invention to provide a process for obtaining propylene terpolymers comprising comonomer units derived from ethylene and from one alpha-olefin selected from the group of $C_4$-$C_8$ alpha-olefins, being characterized by a total content of comonomer units not less than 8% wt and a value of the weight ratio of ethylene to the $C_4$-$C_8$ alpha-olefins ranging from 0.1 to 0.8, said process being carried out in a gas-phase reactor comprising two interconnected polymerization zones.

It has surprisingly been found that carrying out the process according to the present invention it is possible to fulfill the above needs and in particular to prepare propylene terpolymers having high xylene soluble fraction providing films having lower sealing initiation temperatures and lower haze.

A polymerization process carried out in a gas-phase polymerization reactor comprising at least two interconnected polymerization zones is described in the European patent EP 782587.

The process is carried out in a first and in a second interconnected polymerization zone to which propylene, ethylene and the $C_4$-$C_8$ alpha-olefin are fed in the presence of a catalyst system and from which the polymer produced is discharged. The growing polymer particles flow through the first of said polymerization zones (riser) under fast fluidization conditions, leave said first polymerization zone and enter the second of said polymerization zones (downcomer) through which they flow in a densified form under the action of gravity, leave said second polymerization zone and are reintroduced into said first polymerization zone, thus establishing a circulation of polymer between the two polymerization zones. Generally, the conditions of fast fluidization in the first polymerization zone is established by feeding the monomers gas mixture below the point of reintroduction of the growing polymer into said first polymerization zone. The velocity of the transport gas into the first polymerization zone is higher than the transport velocity under the operating conditions and is normally between 2 and 15 m/s. In the second polymerization zone, where the polymer flows in densified form under the action of gravity, high values of density of the solid are reached which approach the bulk density of the polymer; a positive gain in pressure can thus be obtained along the direction of flow, so that it becomes possible to reintroduce the polymer into the first reaction zone without the help of mechanical means. In this way, a "loop" circulation is set up, which is defined by the balance of pressures between the two polymerization zones and by the head loss introduced into the system. Optionally, one or more inert gases, such as nitrogen or an aliphatic hydrocarbon, are maintained in the polymerization zones, in such quantities that the sum of the partial pressures of the inert gases is preferably between 5 and 80% of the total pressure of the gases. The operating parameters such as, for example, the temperature are those that are usual in gas-phase olefin polymerization processes, for example between 50° C. and 120° C. The process can be carried out under operating pressure of between 0,5 and 10 MPa, preferably between 1.5 and 6 MPa.

Preferably, the various catalyst components are fed to the first polymerization zone, at any point of said first polymerization zone. However, they can also be fed at any point of the second polymerization zone. Molecular weight regulators known in the art, particularly hydrogen, can be used to regulate the molecular weight of the growing polymer.

By the use of the means described in WO00/02929 it is possible to totally or partially prevent that the gas mixture present in the riser enters the downcomer; in particular, this is preferably obtained by introducing in the downcomer a gas and/or liquid mixture having a composition different from the gas mixture present in the riser. According to a particularly advantageous embodiment of the present invention, the introduction into the downcomer of said gas and/or liquid mixture having a composition different from the gas mixture present in the riser is effective in preventing the latter mixture from entering the downcomer. Therefore, it is possible to obtain two interconnected polymerization zones having different monomer compositions and thus able to produce polymers with different properties.

Typically, when the propylene terpolymer is produced in the gas-phase polymerization reactor comprising the two interconnected polymerization zones, in accordance with WO 00/02929, the ethylene-reach polymerization zone is the riser.

In the riser, the molar concentration of ethylene (expressed as mole % with respect to the total amount of the monomers in the gas-phase) usually ranges from 0.5 to 5 mole %, preferably from 1 to 4 mole % and the molar concentration of the $C_4$-$C_8$ alpha-olefin ranges from 7 to 20 mole %, preferably from 9 to 18 mole %. When the barrier effect is not applied, the concentrations of the monomers in the downcomer are similar to those in the riser. Whereas, by virtue of the barrier effect provided by the gas and/or liquid feeding described above, the composition of the gas phase in the downcomer is less reach in ethylene and in general in the range of from 0.1-0.5 mole %, preferably from 0.2 to 0.4 mole %, whereas the content of the $C_4$-$C_8$ alpha-olefin ranges from 5 to 15 mole %, preferably from 6 to 13 mole %. In this case, the ratio between the ethylene content in the riser and that in the downcomer is typically higher than 3 and more typically higher than 4, whereas the ratio between the $C_4$-$C_8$ alpha-olefin content in the riser and that in the downcomer is typically higher than 1.1 and preferably ranges from 1.1 to 2.

The Ziegler-Natta catalysts suitable for producing the propylene terpolymers of the instant invention comprise a solid catalyst component comprising at least one titanium compound having at least one titanium-halogen bond and at least an electron-donor compound (internal donor), both supported on magnesium chloride. The Ziegler-Natta catalysts systems further comprise an organo-aluminum compound as essential co-catalyst and optionally an external electron-donor compound.

Suitable catalysts systems are described in the European patents EP45977, EP361494, EP728769, EP 1272533 and in the international patent application WO00/63261. Preferably, the solid catalyst component comprises Mg, Ti, halogen and an electron donor selected from mono- and diesters of aromatic dicarboxylic acids having the —COOH groups into ortho position, wherein at least one of the R hydrocarbyl radical of the —COOR groups contains from 1 to 20 carbon atoms. Particularly preferably the electron donor is selected from di-n-propyl, di-n-butyl, diisobutyl, di-n-heptyl, di-2-ethylhexyl, di-n-octyl, di-neopentil phthalates.

According to a preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times. The internal donor can be added during the treatment with $TiCl_4$ and the treatment with the electron donor compound can be repeated one or more times. Generally, the internal electron donor compound is used in molar ratio with respect to the $MgCl_2$ of from 0.01 to 1 preferably from 0.05 to 0.5. The preparation of catalyst components in spherical form is described for example in European patent application EP-A-395083 and in the International patent application WO98/44009. The solid catalyst components obtained according to the above method show a surface area (by B.E.T. method) generally between 20 and 500 m$^2$/g and preferably between 50 and 400 m$^2$/g, and a total porosity (by B.E.T. method) higher than 0.2 cm$^3$/g preferably between 0.2 and 0.6 cm$^3$/g. The porosity (Hg method) due to pores with radius up to 10.000 Å generally ranges from 0.3 to 1.5 cm$^3$/g, preferably from 0.45 to 1 cm$^3$/g.

The organo-aluminum compound is preferably an alkyl-Al selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkyl-aluminum sesquichlorides such as $AlEt_2Cl$ and $Al_2Et_3Cl_3$.

Preferred external electron-donor compounds include silicon compounds, esters such as ethyl 4-ethoxybenzoate, heterocyclic compounds and particularly 2,2,6,6-tetramethyl piperidine and ketones. Another class of preferred external donor compounds is that of silicon compounds of formula $R_a^5R_b^6Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Particularly preferred are methylcyclohexyldimethoxysilane, diphenyldimethoxysilane, diisopropyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane and 1,1,1, trifluoropropyl-metil-dimethoxysilane. The external electron donor compound is used in such an amount to give a molar ratio between the organo-aluminum compound and said electron donor compound of from 0.1 to 500.

The catalytic system can be pre-contacted (pre-polymerized) with small amounts of olefins. The molecular weight of the propylene terpolymers can be regulated by using known regulators, such as hydrogen.

The propylene terpolymers obtained by the process of the present invention comprise comonomer units derived from ethylene and from one alpha-olefin selected from the group of $C_4$-$C_8$ alpha-olefins and being characterized by the fact that the content of ethylene ranges from 0.5 to 6% by weight, preferably from 1 to 4% by weight, and the content of comonomer units derived from the $C_4$-$C_8$ alpha-olefins ranges from 2.5 to 15%, preferably from 4 to 15% by weight, more preferably from 5 to 13% by weight. The comonomer units derived from the $C_4$-$C_8$ alpha-olefins are preferably derived from butene-1.

The propylene terpolymers according to the present invention show low sealing initiation temperature ranging from 100 to 116° C., a fraction soluble in hexane lower than 6, preferably lower than 5.5% and more preferably lower than 4, a Melt Flow Index (MFR "L") ranging from 0.1 to 100 g/10 min, preferably from 0.1 to 50 g/10 min.

If necessary, the molecular weight of the terpolymers can be modified by visbreaking according to well known techniques.

It is another object of the present invention to prepare propylene terpolymers particularly suitable for applications such cast films and oriented films, BOPP films, heat-sealable films and all the applications requiring heat sealability and softness. Such propylene terpolymers have a good balance between optical properties and sealing properties combined with good shrinkage properties and softness.

The films produced by said propylene terpolymers show very low percentage of haze, lower than 1%, preferably lower than 0.7%, and very high percentage of gloss, higher than 88.5%, meaning that the films according to the present invention have optical properties which are optimal for the above-mentioned applications.

Said preferred propylene terpolymers according to the invention are characterized by:
 a xylene soluble fraction higher than 9 wt %;
 a total content of comonomer units not less than 8 wt %;
 a ratio of ethylene to the $C_4$-$C_8$ alpha-olefins ranging from 0.1 to 0.8; and
 a melting temperature $T_m$ higher than or equal to $(28.013X+120.5)°$ C., preferably higher than or equal to $(21.087X+123.73)°$ C., where X is the value of the weight ratio of ethylene content to the $C_4$-$C_8$ alpha-olefins content.

In order to maintain the optimal balance of properties of the propylene terpolymers, particularly in terms of high melting temperatures and softness, it is preferable to balance the ethylene and butene-1 content: Specifically, when the ethylene content is lower than 2.5 wt %, the butene-1 content is preferably higher than 10 wt %. Whereas, when the ethylene content is higher than 2.5 wt %, the butene-1 content is lower than 10 wt %, provided that the total minimum content of the comonomer units is not less than 8 wt %. The main application of the propylene terpolymers of the invention is the production of films, particularly oriented films and heat-sealable films. The oriented films comprising the propylene terpolymers of the invention have good optical properties and excellent sealing properties combined with good shrinkage properties and softness.

It has been found that the films comprising the propylene terpolymers having the above described characteristics have high shrinkage (higher than 30% at 110° C. and preferably higher than 35%).

Furthermore, due to the relatively high xylene soluble fraction of the propylene terpolymers according to the invention, the films obtained therefrom are particularly suitable in applications requiring a certain degree of softness as shown by the Flexural Modulus lower than 750 MPa and preferably in the range 500 to 700 MPa. Furthermore, said films are characterized by a high melting temperature, it means a wide processability window, combined with low sealing initiation temperature and good optical properties described above.

The propylene terpolymers of the invention might further comprise at least one nucleating agent. Preferably, the propylene terpolymers comprise up to 2500 ppm, more preferably from 500 to 2000 ppm, of at least one nucleating agent.

The propylene terpolymers comprising at least one nucleating agent are particularly suitable for producing blown films.

The at least one nucleating agent can be selected among inorganic additives such as talc, silica or kaolin, salts of monocarboxylic or polycarboxylic acids, e.g. sodium benzoate or aluminum tert-butylbenzoate, dibenzylidenesorbitol or its $C_1$-$C_8$-alkyl-substituted derivatives such as methyldibenzylidenesorbitol, ethyldibenzylidenesorbitol or dimethyldibenzylidenesorbitol or salts of diesters of phosphoric acid, e.g. 2,2'-methylenebis(4,6,-di-tert-butylphenyl)phosphate sodium or lithium salt. Particularly preferred nucleating agents are 3,4-dimethyldibenzylidenesorbitol; aluminum-hydroxy-bis[2,2'-methylene-bis(4,6-di-t-butylphenyl) phosphate]; sodium 2,2'-methylene-bis(4,6-ditertbutylphenyl)phosphate and bicyclo[2.2.1]heptane-2,3-dicarboxylic acid, disodium salt (1R,2R,3R,4S). The at least one nucleating agent may be added to the propylene terpolymer by known methods, such as by melt blending the at least one nucleating agent and the propylene terpolymer under shear condition in a conventional extruder.

The propylene terpolymers obtained by the process of the present invention may then be added with additional additives commonly employed in the polyolefin field, such as antioxidants, light stabilizers, antiacids, colorants and fillers.

The following not-limiting examples are given to better illustrate the present invention.

EXAMPLES

The following characterization methods were used in testing the propylene terpolymers produced.
 Determination of the comonomer content: by infrared spectroscopy (IR spectroscopy).
 Solubility in xylene: 2.5 g of polymer are dissolved in 250 ml of xylene at 135° C. under agitation. After 20 minutes the solution is allowed to cool to 25° C., still under agitation, and then allowed to settle for 30 minutes. The precipitate is filtered with filter paper, the solution evaporated in nitrogen flow, and the residue dried under vacuum at 80° C. until constant weight is reached. Thus one calculates the percent by weight of polymer soluble and insoluble at room temperature (25° C.)
 Melt Flow Rate (MFR"L"): Determined according to ASTM D1238, condition L.
 Flexural modulus: Determined according to the ISO 178 method.
 Izod impact resistance: Determined according to the ISO 180/1A method.

Melting temperature: Determined by differential scanning calorimetry (DSC) according to the ASTM D 3417 method, which is equivalent to the ISO 11357/1 and 3 method.

Hexane soluble on film: Determined according to FDA 177, 1520, by suspending in an excess of hexane a 100 µm thick film specimen of the composition being analyzed, in an autoclave at 50° C. for 2 hours. Then the hexane is removed by evaporation and the dried residue is weighed.

Shrinkage measurement

Film shrinkage has been determined by placing 200×20 mm film samples in an oven with circulating air. Oven residence time was 180 seconds (+/−5 secs) at different air temperatures (100-110° C.). Calculation of the final film shrinkage has been determined by the following relation:

Film Shrinkage=$(Li-Lf)/Li*100$ being

Li=Initial film dimension

Lf=Film dimension after the oven-treatment

Measurements were done when film reached the room temperature (approx. 15-20 minutes)

Sealing Initiation Temperature (S.I.T.):

Determined as follows.

Preparation of the film specimens

Some films with a thickness of 50 µm are prepared by extruding each test composition in a single screw Collin extruder (length/diameter ratio of screw: 25) at a film drawing speed of 7 m/min. and a melt temperature of 210-250° C. Each resulting film is superimposed on a 1000 µm thick film of a propylene homopolymer having an isotacticity index of 97 and a MFR L of 2 g/10 min. The superimposed films are bonded to each other in a Carver press at 200° C. under a 9000 kg load, which is maintained for 5 minutes.

The resulting laminates are stretched longitudinally and transversally, i.e. biaxially, by a factor 6 with a TM Long film stretcher at 150° C., thus obtaining a 20 µm thick film (18 µm homopolymer+2 µm test composition).

2×5 cm specimens are cut from the films.

Determination of the S.I.T.

For each test two of the above specimens are superimposed in alignment, the adjacent layers being layers of the particular test composition. The superimposed specimens are sealed along one of the 5 cm sides with a Brugger Feinmechanik Sealer, model HSG-ETK 745. Sealing time is 0.5 seconds at a pressure of 0.1 N/mm². The sealing temperature is increased for each seal, starting from about 10° C. less than the melting temperature of the test composition. The sealed samples are left to cool and then their unsealed ends are attached to an Instron machine where they are tested at a traction speed of 50 mm/min.

The S.I.T. is the minimum sealing temperature at which the seal does not break when a load of at least 2 Newtons is applied in the said test conditions.

Haze (on 1 mm plaque):

According to the method used, 5×5 cm specimens are cut molded plaques of 1 mm thick and the haze value is measured using a Gardner photometric unit connected to a Hazemeter type UX-10 or an equivalent instrument having G.E. 1209 light source with filter "C". Reference samples of known haze are used for calibrating the instrument. The plaques to be tested are produced according to the following method. 75×75×1 mm plaques are molded with a GBF Plastiniector G235/90 Injection Molding Machine, 90 tons under the following processing conditions:

| | |
|---|---|
| Screw rotation speed: | 120 rpm |
| Back pressure: | 10 bar |
| Melt temperature: | 260° C. |
| Injection time: | 5 sec |
| Switch to hold pressure: | 50 bar |
| First stage hold pressure: | 30 bar |
| Second stage pressure: | 20 bar |
| Hold pressure profile: | First stage 5 sec |
| | Second stage 10 sec |
| Cooling time: | 20 sec |
| Mold water temperature: | 40° C. |

Gloss film:

Determined on the same specimens as for the Haze.

The instrument used for the test is a model 1020 Zehntner photometer for incident measurements. The calibration is made by carrying out a measurement at incidence angle of 60° on black glass having a standard Gloss of 96.2% and a measurement at an incidence angle of 45° on black glass having a standard Gloss of 55.4%.

Examples 1-3

Propylene terpolymers are prepared by polymerising propylene, ethylene and butene-1 in the presence of a highly stereospecific Ziegler-Natta catalyst.

The Ziegler-Natta catalyst was prepared according to the Example 5, lines 48-55 of the European Patent EP728769. Triethylaluminium (TEA) was used as co-catalyst and dicyclopentyldimethoxysilane as external donor, with the weight ratios indicated in Table 1. The propylene terpolymers of the examples were prepared in a single gas-phase polymerization reactor comprising two interconnected polymerization zones, a riser and a downcomer, as described in the European Patent EP782587 and WO00/02929.

The above catalyst system is then transferred into a reactor containing an excess of liquid propylene and propane to carry out prepolymerisation at 25° C. for 11 minutes before introducing it into a polymerisation reactor.

Into the polymerisation reactor the propylene terpolymers are produced by feeding in a continuous and constant flow the prepolymerized catalyst system, hydrogen (used as molecular weight regulator), propylene, ethylene and butene-1 in the gas state (the feeding quantities expressed in mol % are shown in table 1).

The other operative conditions are indicated in Table 1.

The polymer particles exiting from the polymerization step were subjected to a steam treatment to remove the unreacted monomers and dried.

The propylene terpolymer according to the Example 3 was compression moulded on a CARVER machine at 230° C. to obtain a plaque 0.5 mm thick and 60×60 mm which then has been stretched using TM-Long Film Stretcher machine at an oven temperature of 80° C. Stretching ratio was 1×7 to obtain a mono-oriented film having approximately 80 µm in thickness on which shrinkage properties are measured.

TABLE 1

|  | Example 1 | | Example 2 | | Example 3 | |
| --- | --- | --- | --- | --- | --- | --- |
| PRECONTACT | | | | | | |
| Temperature, ° C. | 15 | | 15 | | 15 | |
| Residence time, min | 12 | | 12 | | 12 | |
| Catalyst, g/h | — | | 3.0 | | 4.0 | |
| TEA/CAT, g/g | 6 | | 6 | | 6 | |
| TEA/Ext. Donor, g/g | 6 | | 6 | | 6 | |
| PREPOLYMERIZATION | | | | | | |
| Temperature, ° C. | 25 | | 25 | | 25 | |
| Residence time, min | 11 | | 11 | | 11 | |
| POLYMERIZATION | | | | | | |
| Temperature, ° C. | 70 | | 70 | | 70 | |
| Pressure, barg | 19 | | 19 | | 19 | |
|  | riser | downcomer | riser | downcomer | riser | downcomer |
| C3-, mole % | 75.3 | 82.9 | 71.8 | 79.5 | 79.2 | 79.6 |
| C2-, mole % | 3.7 | 0.25 | 2.7 | 0.32 | 1.2 | 0.24 |
| C4-, mole % | 9.5 | 6.1 | 16.0 | 11.76 | 13.6 | 11.74 |
| $H_2/C_3^-$, mol ratio | 0.003 | 0.006 | 0.003 | 0.007 | 0.004 | 0.005 |

TABLE 2

| Example | 1 | 2 | 3 | Comparative Ex. 1 |
| --- | --- | --- | --- | --- |
| Ethylene content, wt % | 3.10 | 2.30 | 1.20 | 4.30 |
| Butene content, wt % | 5.9 | 10.8 | 11.3 | 8.0 |
| Ethylene to Butene-1 ratio | 0.52 | 1.21 | 0.11 | 0.53 |
| XS, wt % | 10.0 | 13.9 | 19.6 | — |
| MFR, g/10 min | 5.9 | 6.3 | 5.1 | 5.5 |
| Melting Temperature, ° C. | 137.5 | 127.4 | 130.4 | 128.0 |
| SIT, ° C. | 113.9 | 104.6 | 107.4 | — |
| Hexane extractable, wt % | 3.5 | 5.3 | 2.8 | — |
| Haze 1 mm plaque, % | 0.6 | 0.2 | 0.2 | 1.3 |
| Gloss film, % | 88.7 | 90.0 | 90.8 | — |
| Shrinkage film, at 110° C., % | — | — | 40.8 | — |
| Flexural modulus, MPa | 665 | 519 | 663 | — |
| Izod at 23° C., KJ/m² | 10.5 | 15.1 | 11.7 | 34.5 |

The propylene terpolymers produced by the process according to the present invention show, provided a fixed ratio between ethylene and butene-1 comonomer units, a higher melting temperature compared to the propylene terpolymer produced by the process according to the invention described in WO 98/58971. It means that, using the process according to the present invention, it is possible to obtain propylene terpolymers having higher melting temperature, and also wider processability window, for the same comonomer content.

This is demonstrated by the fact that the $T_m$ of the terpolymers of the Examples 1-3 is higher than (28.013X+120.5), where X is the value of the ratio of ethylene to the $C_4$-$C_8$ alpha-olefins, whereas the terpolymer of the comparative example 1 has a $T_m$ lower than that value.

What is claimed is:

1. A process for producing a propylene terpolymer in a single gas-phase polymerization reactor comprising two interconnected polymerization zones comprising the steps of:
    (a) feeding a first gas mixture comprising:
        (i) a first concentration of propylene;
        (ii) a first concentration of ethylene; and
        (iii) a first concentration of a butene;
        into a first interconnected polymerization zone in the presence of a catalyst for producing a polymer;
    (b) directing the polymer into a second interconnected polymerization zone;
    (c) re-introducing the polymer into the first interconnected polymerization zone; and
    (d) recovering the propylene terpolymer comprising:
        (i) ethylene derived units;
        (ii) propylene derived units; and,
        (iii) butene derived units;
        wherein the total content of ethylene and butene derived units are present in the propylene terpolymer in an amount not less than 8% by weight, based on the total weight of the propylene terpolymer,
        wherein the weight ratio of ethylene to butene ranges from 0.21:1 to 0.52:1,
        wherein when the ethylene content ranges from 2.30 to 3.10% by weight, based on the total weight of the propylene terpolymer, the butene content is higher than 5.9% by weight, based on the total weight of the propylene terpolymer, and
        wherein the propylene terpolymer comprises 10-13.9 wt. % of a xylene soluble fraction based upon the total weight of the propylene terpolymer and a flexural modulus of less than 750 MPa.

2. The process of claim 1, wherein the first concentration of butene ranges from 7 to 20 mole % based upon the total molar amount of propylene, ethylene and butene present in the first gas mixture.

3. The process of claim 1, wherein the catalyst is a Ziegler-Natta catalyst comprising a solid catalyst component wherein the solid catalyst component comprises:
    (i) magnesium chloride;
    (ii) at least one titanium compound having at least one titanium-halogen bond; and
    (iii) at least one electron-donor compound;
    wherein the at least one titanium compound and the at least one electron-donor compound are supported on magnesium chloride.

4. The process of claim 1, wherein the first concentration of ethylene ranges from 0.5 to 5 mole % based upon the total molar amount of propylene, ethylene and butene present in the first gas mixture.

5. The process of claim 1, wherein the propylene terpolymer has a sealing initiation temperature ranging from 100 to 116° C., a fraction soluble in hexane lower than 6 wt % and a melt flow index ranging from 0.1 to 100 g/10 min.

6. A propylene terpolymer film comprising the propylene terpolymer produced in accordance with claim 1, wherein said film is characterized by a haze percentage of less than 0.7% and a gloss percentage of greater than 88.5%.

7. The propylene terpolymer film of claim 6, wherein said film is characterized by a shrinkage percentage of greater than 30% at a temperature of 110° C.

8. The propylene terpolymer film of claim 6, wherein said film is characterized by a flexural modulus value in a range of 500 to 700 MPa.

9. The process of claim 1, wherein the first interconnected polymerization zone is a riser and the second interconnected polymerization zone is a downcomer.

\* \* \* \* \*